United States Patent
Nishi et al.

(10) Patent No.: US 7,409,103 B2
(45) Date of Patent: *Aug. 5, 2008

(54) METHOD OF REDUCING NOISE IN IMAGES

(75) Inventors: Noriyuki Nishi, Wakayama (JP);
Hisakazu Kuramoto, Wakayama (JP);
Takuma Suzuki, Wakayama (JP);
Minoru Yamamoto, Suita (JP)

(73) Assignee: Noritsu Koki Co., Ltd., Wakayama (JP)

( * ) Notice: Subject to any disclaimer, the term of this patent is extended or adjusted under 35 U.S.C. 154(b) by 652 days.

This patent is subject to a terminal disclaimer.

(21) Appl. No.: 10/996,243

(22) Filed: Nov. 23, 2004

(65) Prior Publication Data
US 2005/0117036 A1 Jun. 2, 2005

(30) Foreign Application Priority Data
Nov. 28, 2003 (JP) .............................. 2003-400488

(51) Int. Cl.
*G06K 9/40* (2006.01)
*G06K 9/00* (2006.01)
*H04N 5/217* (2006.01)
*H04B 1/66* (2006.01)

(52) U.S. Cl. .................. 382/275; 382/162; 382/260; 382/268; 348/241; 375/240.21

(58) Field of Classification Search .............. 348/241, 348/254, 268, 275, 266; 375/240.03, 240.15, 375/240.29, 240.21; 382/260, 275, 162, 382/268
See application file for complete search history.

(56) References Cited
U.S. PATENT DOCUMENTS

| | | | | |
|---|---|---|---|---|
| 5,479,211 A * | 12/1995 | Fukuda .................. 375/240.03 |
| 5,555,028 A * | 9/1996 | Kim ........................... 348/607 |
| 5,920,356 A * | 7/1999 | Gupta et al. ................ 348/606 |
| 5,959,693 A * | 9/1999 | Wu et al. ..................... 348/624 |
| 6,236,763 B1 * | 5/2001 | Wong et al. ................. 382/261 |
| 6,360,024 B1 * | 3/2002 | Tan et al. .................... 382/260 |
| 6,535,254 B1 * | 3/2003 | Olsson et al. ............... 348/607 |
| 6,631,162 B1 * | 10/2003 | Lee et al. ............... 375/240.16 |
| 6,795,588 B1 * | 9/2004 | Nio et al. .................... 382/261 |
| 7,006,255 B2 * | 2/2006 | Sun et al. .................... 358/3.27 |
| 7,054,503 B2 * | 5/2006 | Ishikawa .................... 382/275 |
| 7,203,234 B1 * | 4/2007 | Zeng ..................... 375/240.03 |

(Continued)

OTHER PUBLICATIONS

European Search Report for European Application No. 04106106.0-1522, dated Feb. 6, 2007 (4 pages).

(Continued)

*Primary Examiner*—Andrew W. Johns
*Assistant Examiner*—Andrae S Allison
(74) *Attorney, Agent, or Firm*—Osha Liang LLP

(57) ABSTRACT

An image noise reducing method that can properly reduce CCD noise which emerges in an image imported from a digital camera is provided. The method includes applying a first filtering step to luminance component image data of the image with each pixel of the luminance component image data being designated as a target pixel, thereby creating luminance component image data with its entirety smoothened, and applying a second filtering step to color-difference component image data of the image with each pixel of the color-difference component image data being designated as a target pixel, thereby creating color-difference component image data with its entirety smoothened.

6 Claims, 14 Drawing Sheets

U.S. PATENT DOCUMENTS 7,206,016 B2 * 4/2007 Gu .......................... 348/14.13
2005/0094003 A1 * 5/2005 Thorell ....................... 348/241

OTHER PUBLICATIONS

Yocum D E et al: "Immunomodulatory Effect 2-7 of Primatized IDEC-CE9.1, An Anti-CD4 Monoclonal Antibody, in RA" Arthritis and Rheumatism, Lippincott, Philadelphia, US, vol. 37, No. 9, Suppl, dated Oct. 23, 1994, p. S336, AN1054, XP001105470, ISSN: 0004-3591 (1 page).

European Patent Office Communication pursuant to Article 96(2) EPC for European Application No. 04 106 106.0-1522, dated Jun. 14, 2007 (3 pages).

John Hartung et al., "Object-Oriented H.263 Compatible Video Coding Platform for Conferencing Applications" IEEE Journal on Selected Areas in Communications, IEEE Service Center, Piscataway, US, vol. 16, No. 1, Jan. 1998, XP0011054740, ISSN: 0733-8716 (14 pages).

* cited by examiner

FIG. 8A

| Y0 | B | | | C | D | E | | | | | | | | | | |
|---|---|---|---|---|---|---|---|---|---|---|---|---|---|---|---|---|
| 84 | 84 | 84 | 85 | 85 | 86 | 86 | 86 | 131 | 96 | 46 | 11 | 8 | 36 | 82 | 113 | 140 | 145 |
| 73 | 74 | 75 | 78 | 81 | 83 | 85 | 86 | 121 | 91 | 48 | 19 | 19 | 50 | 94 | 126 | 138 | 143 |
| 64 | 65 | 67 | 69 | 72 | 75 | 77 | 78 | 104 | 82 | 51 | 32 | 39 | 72 | 113 | 142 | 134 | 139 |
| 68 | 68 | 66 | 65 | 63 | 61 | 60 | 69 | 83 | 70 | 54 | 48 | 62 | 93 | 128 | 153 | 129 | 134 |
| 80 | 76 | 71 | 65 | 58 | 52 | 47 | 44 | 62 | 58 | 56 | 61 | 79 | 106 | 134 | 153 | 123 | 129 |
| 81 | 78 | 73 | 67 | 61 | 55 | 51 | 48 | 44 | 48 | 56 | 70 | 89 | 110 | 129 | 141 | 118 | 124 |
| 68 | 68 | 68 | 69 | 70 | 71 | 72 | 72 | 32 | 40 | 55 | 74 | 92 | 108 | 118 | 125 | 114 | 121 |
| 54 | 56 | 62 | 70 | 78 | 85 | 91 | 94 | 25 | 36 | 55 | 75 | 93 | 104 | 110 | 113 | 112 | 119 |
| 127 | 92 | 65 | 80 | 124 | 144 | 116 | 75 | 33 | 49 | 75 | 101 | 119 | 125 | 124 | 122 | 153 | 148 |
| 102 | 70 | 48 | 67 | 106 | 118 | 89 | 61 | 48 | 62 | 84 | 105 | 117 | 118 | 112 | 108 | 145 | 140 |
| 78 | 49 | 36 | 58 | 88 | 87 | 57 | 28 | 63 | 76 | 94 | 109 | 116 | 112 | 102 | 96 | 133 | 126 |
| 75 | 49 | 42 | 67 | 84 | 70 | 43 | 27 | 67 | 79 | 97 | 112 | 117 | 113 | 103 | 96 | 119 | 112 |
| 95 | 66 | 60 | 84 | 89 | 63 | 44 | 48 | 63 | 76 | 96 | 113 | 121 | 118 | 110 | 105 | 107 | 102 |
| 114 | 80 | 71 | 90 | 83 | 50 | 44 | 69 | 67 | 80 | 99 | 115 | 123 | 120 | 111 | 105 | 100 | 97 |
| 120 | 80 | 65 | 79 | 63 | 26 | 33 | 76 | 82 | 93 | 108 | 120 | 121 | 113 | 101 | 93 | 97 | 96 |
| 117 | 73 | 54 | 64 | 42 | 6 | 21 | 74 | 99 | 106 | 117 | 123 | 120 | 107 | 91 | 79 | 95 | 96 |
| 103 | 91 | 75 | 62 | 55 | 58 | 68 | 73 | 104 | 101 | 93 | 77 | 63 | 69 | 90 | 110 | 81 | 95 |
| 103 | 89 | 69 | 54 | 50 | 57 | 73 | 83 | 101 | 95 | 87 | 88 | 97 | 112 | 126 | 133 | 91 | 104 |

FIG. 8B

| Y1 | B | | | | E | | | | | | | | | | |
|---|---|---|---|---|---|---|---|---|---|---|---|---|---|---|---|---|
| 79 | 84 | 84 | 85 | 85 | 86 | 86 | 92 | 119 | 96 | 46 | 11 | 8 | 36 | 82 | 114 | 135 | 145 |
| 74 | 74 | 75 | 78 | 81 | 83 | 85 | 92 | 109 | 91 | 48 | 19 | 19 | 50 | 94 | 122 | 137 | 143 |
| 68 | 65 | 67 | 69 | 72 | 75 | 77 | 83 | 94 | 82 | 51 | 32 | 39 | 72 | 113 | 135 | 137 | 139 |
| 68 | 68 | 66 | 65 | 63 | 61 | 60 | 64 | 75 | 70 | 54 | 48 | 62 | 93 | 128 | 143 | 136 | 134 |
| 77 | 76 | 71 | 65 | 58 | 52 | 47 | 48 | 58 | 58 | 56 | 61 | 79 | 106 | 134 | 143 | 135 | 129 |
| 83 | 78 | 73 | 67 | 61 | 55 | 51 | 48 | 46 | 48 | 56 | 70 | 89 | 110 | 129 | 134 | 124 | 124 |
| 74 | 68 | 68 | 69 | 70 | 71 | 72 | 66 | 40 | 40 | 55 | 74 | 92 | 108 | 118 | 121 | 118 | 121 |
| 60 | 56 | 62 | 70 | 78 | 85 | 91 | 67 | 33 | 36 | 55 | 75 | 93 | 104 | 110 | 112 | 114 | 119 |
| 119 | 92 | 65 | 80 | 124 | 144 | 116 | 78 | 42 | 49 | 75 | 101 | 119 | 125 | 124 | 128 | 146 | 148 |
| 95 | 70 | 48 | 67 | 106 | 118 | 89 | 56 | 51 | 62 | 84 | 105 | 117 | 118 | 112 | 115 | 138 | 140 |
| 74 | 49 | 36 | 58 | 88 | 87 | 57 | 40 | 60 | 76 | 94 | 109 | 116 | 112 | 102 | 103 | 126 | 126 |
| 73 | 49 | 42 | 67 | 84 | 70 | 43 | 36 | 63 | 79 | 97 | 112 | 117 | 113 | 103 | 102 | 113 | 112 |
| 90 | 66 | 60 | 84 | 89 | 63 | 44 | 50 | 63 | 76 | 96 | 113 | 121 | 118 | 110 | 106 | 106 | 102 |
| 108 | 80 | 71 | 90 | 83 | 50 | 44 | 64 | 70 | 80 | 99 | 115 | 123 | 120 | 111 | 105 | 100 | 97 |
| 112 | 80 | 65 | 79 | 63 | 26 | 33 | 71 | 83 | 93 | 108 | 120 | 121 | 113 | 101 | 95 | 96 | 96 |
| 108 | 73 | 54 | 64 | 42 | 6 | 21 | 73 | 95 | 106 | 117 | 123 | 120 | 107 | 91 | 85 | 92 | 96 |
| 102 | 91 | 75 | 62 | 55 | 58 | 68 | 78 | 92 | 101 | 93 | 77 | 63 | 69 | 90 | 100 | 80 | 95 |
| 102 | 89 | 69 | 54 | 50 | 57 | 73 | 85 | 96 | 95 | 87 | 88 | 97 | 112 | 126 | 126 | 100 | 104 |

FIG. 9A

| Y1 | B | | | | | | | | | | | | | | |
|---|---|---|---|---|---|---|---|---|---|---|---|---|---|---|---|
| 79 | 84 | 84 | 85 | 85 | 86 | 86 | 92 | 119 | 96 | 46 | 11 | 8 | 36 | 82 | 114 | 136 | 145 |
| 74 | 74 | 75 | 78 | 81 | 83 | 85 | 92 | 109 | 91 | 48 | 19 | 19 | 50 | 94 | 122 | 137 | 143 |
| 68 | 65 | 67 | 69 | 72 | 75 | 77 | 83 | 94 | 82 | 51 | 32 | 39 | 72 | 113 | 135 | 137 | 139 |
| 68 | 68 | 66 | 65 | 63 | 61 | 60 | 64 | 76 | 70 | 54 | 48 | 62 | 93 | 128 | 143 | 135 | 134 |
| 77 | 76 | 71 | 65 | 58 | 52 | 47 | 48 | 58 | 58 | 56 | 61 | 79 | 106 | 134 | 143 | 130 | 129 |
| 83 | 78 | 73 | 67 | 61 | 55 | 51 | 48 | 46 | 48 | 56 | 70 | 89 | 110 | 129 | 134 | 124 | 124 |
| 74 | 68 | 68 | 69 | 70 | 71 | 72 | 66 | 40 | 40 | 55 | 74 | 92 | 108 | 118 | 121 | 118 | 121 |
| 60 | 56 | 62 | 70 | 78 | 85 | 91 | 87 | 33 | 36 | 55 | 75 | 93 | 104 | 110 | 112 | 114 | 119 |
| 119 | 92 | 65 | 80 | 124 | 144 | 116 | 75 | 42 | 49 | 75 | 101 | 119 | 125 | 124 | 128 | 146 | 148 |
| 95 | 70 | 48 | 67 | 106 | 118 | 89 | 56 | 51 | 62 | 84 | 105 | 117 | 118 | 112 | 115 | 138 | 140 |
| 74 | 49 | 36 | 58 | 88 | 87 | 57 | 40 | 60 | 76 | 94 | 109 | 116 | 112 | 102 | 103 | 126 | 126 |
| 73 | 49 | 42 | 67 | 84 | 70 | 43 | 36 | 63 | 79 | 97 | 112 | 117 | 113 | 103 | 102 | 113 | 112 |
| 90 | 66 | 60 | 84 | 89 | 63 | 44 | 50 | 63 | 76 | 96 | 113 | 121 | 118 | 110 | 105 | 106 | 102 |
| 108 | 80 | 71 | 90 | 83 | 50 | 44 | 64 | 70 | 80 | 99 | 115 | 123 | 120 | 111 | 105 | 100 | 97 |
| 112 | 80 | 65 | 79 | 63 | 26 | 33 | 71 | 83 | 93 | 108 | 120 | 121 | 113 | 101 | 95 | 96 | 96 |
| 108 | 73 | 54 | 64 | 42 | 6 | 21 | 73 | 95 | 106 | 117 | 123 | 120 | 107 | 91 | 85 | 92 | 96 |
| 102 | 91 | 75 | 62 | 55 | 58 | 68 | 78 | 97 | 101 | 93 | 77 | 63 | 69 | 90 | 100 | 90 | 95 |
| 102 | 89 | 69 | 54 | 50 | 57 | 73 | 85 | 96 | 95 | 87 | 88 | 97 | 112 | 126 | 126 | 100 | 104 |

FIG. 9B

| Y2 | B | | | | | | | | | | | | | | |
|---|---|---|---|---|---|---|---|---|---|---|---|---|---|---|---|
| 78 | 82 | 82 | 84 | 84 | 85 | 86 | 92 | 117 | 95 | 46 | 13 | 10 | 39 | 84 | 116 | 136 | 145 |
| 74 | 74 | 75 | 78 | 81 | 83 | 85 | 92 | 109 | 91 | 48 | 19 | 19 | 50 | 94 | 122 | 137 | 143 |
| 68 | 65 | 67 | 69 | 72 | 75 | 77 | 83 | 94 | 82 | 51 | 32 | 39 | 72 | 113 | 135 | 137 | 139 |
| 68 | 68 | 66 | 65 | 63 | 61 | 60 | 64 | 76 | 70 | 54 | 48 | 62 | 93 | 128 | 143 | 135 | 134 |
| 77 | 76 | 71 | 65 | 58 | 52 | 47 | 48 | 58 | 58 | 56 | 61 | 79 | 106 | 134 | 143 | 130 | 129 |
| 83 | 78 | 73 | 67 | 61 | 55 | 51 | 48 | 46 | 48 | 56 | 70 | 89 | 110 | 129 | 134 | 124 | 124 |
| 74 | 68 | 68 | 69 | 70 | 71 | 72 | 66 | 40 | 40 | 55 | 74 | 92 | 108 | 118 | 121 | 118 | 121 |
| 69 | 54 | 64 | 72 | 82 | 88 | 92 | 80 | 36 | 39 | 59 | 80 | 98 | 109 | 114 | 117 | 121 | 125 |
| 108 | 82 | 61 | 75 | 114 | 133 | 106 | 74 | 42 | 49 | 73 | 97 | 113 | 119 | 119 | 122 | 138 | 141 |
| 95 | 70 | 48 | 67 | 106 | 118 | 89 | 56 | 51 | 62 | 84 | 105 | 117 | 118 | 112 | 115 | 138 | 140 |
| 74 | 49 | 36 | 58 | 88 | 87 | 57 | 40 | 60 | 76 | 94 | 109 | 116 | 112 | 102 | 103 | 126 | 126 |
| 73 | 49 | 42 | 67 | 84 | 70 | 43 | 36 | 63 | 79 | 97 | 112 | 117 | 113 | 103 | 102 | 113 | 112 |
| 90 | 66 | 60 | 84 | 89 | 63 | 44 | 50 | 63 | 76 | 96 | 113 | 121 | 118 | 110 | 106 | 106 | 102 |
| 108 | 80 | 71 | 90 | 83 | 50 | 44 | 64 | 70 | 80 | 99 | 115 | 123 | 120 | 111 | 105 | 100 | 97 |
| 112 | 80 | 65 | 79 | 63 | 26 | 33 | 71 | 83 | 93 | 108 | 120 | 121 | 113 | 101 | 95 | 96 | 96 |
| 108 | 78 | 60 | 67 | 39 | 18 | 29 | 73 | 93 | 102 | 110 | 116 | 114 | 102 | 99 | 90 | 92 | 96 |
| 103 | 87 | 70 | 61 | 51 | 52 | 63 | 76 | 95 | 101 | 97 | 85 | 75 | 81 | 96 | 102 | 92 | 97 |
| 102 | 89 | 69 | 54 | 50 | 57 | 73 | 85 | 96 | 95 | 87 | 88 | 97 | 112 | 126 | 126 | 100 | 104 |

METHOD OF REDUCING NOISE IN IMAGES

CROSS REFERENCE TO RELATED APPLICATION

This application claims priority from Japanese Patent Application No. 2003-400488, which is incorporated herein by reference.

BACKGROUND OF THE INVENTION

1. Field of the Invention

The present invention relates to a method of reducing image noise which is likely to emerge in an image imported from a digital camera equipped with a CCD or other light sensitive device.

2. Related Art

In an image imported from a digital camera, false colors, so-called CCD noise perceived as small spots scattered in the image, which results from underexposure which may occur depending on the image capturing conditions, sometimes emerge. This CCD noise frequently emerges when a dark place is captured by using a digital camera with a low resolution.

Due to errors in quantization and reverse quantization respectively in encoding and decoding, when encoded, compressed image data on a block-by-block basis is decoded, noise such as block noise and mosquito noise may emerge, in which the former results from discontinuity along the boundary of adjacent blocks which is perceived like a mosaic appearance, and the latter is perceived like swarms of mosquitoes clustered around a contour of a character or a figure on the background of the image (hereinafter referred simply to "a contour").

It is an object of the present invention to provide a method of reducing noise in images that is capable of properly reducing CCD noise, which emerges in an image imported from a digital camera.

It is another object of the present invention to provide a method of reducing noise in images that is capable of properly reducing block noise and mosquito noise, as well as CCD noise, in which block noise and mosquito noise emerge in an image at the time of decoding encoded, compressed image data on a block-by-block basis, after it has been imported from a digital camera.

SUMMARY OF THE INVENTION

According to the present invention, there is provided a method of reducing image noise which emerges in an image imported from a digital camera equipped with a CCD or other light sensitive device. The method includes: applying a first filtering step to luminance component image data of the image with each pixel of the luminance component image data being designated as a target pixel, thereby creating luminance component image data with its entirety smoothened; and applying a second filtering step to color-difference component image data of the image with each pixel of the color-difference component image data being designated as a target pixel, thereby creating color-difference component image data with its entirety smoothened.

With the above image noise reducing method, the luminance component image data and the color-difference component image data are independently subjected to different steps so that CCD noise can be properly reduced without deterioration of the image quality.

The above method is applicable more specifically to an image imported from the digital camera whose image data is once encoded on a block-by-block basis and then decoded after imported. The method applied to such an image further includes: dividing each of luminance component image data and color-difference component image data of the image data into blocks corresponding to the blocks created in the encoding and decoding of the image data; applying a third filtering step to the luminance component image data with each of pixels on the boundaries of the blocks being designated as a target pixel, thereby creating a first luminance component image data with the boundaries of the blocks smoothened; performing a fourth filtering step with each pixel of the first luminance component image data being designated as a target value, thereby creating a second luminance component image data with its entirety smoothened; creating edge image data by subtracting each pixel value of the second luminance component image data from a corresponding pixel value of the first luminance component image data; creating corrected edge image data with each difference value of the edge image data corrected under given conditions; creating a third luminance component image data by adding each offset value of the corrected edge image data to its corresponding pixel value of the second luminance component image data; applying a fifth filtering step to the color-difference component image data with each pixel of the color-difference component image data being designated as a target pixel, thereby creating a first color-difference component image data with its entirety smoothened; and then applying any one of the first and second filtering steps to the third luminance component image data and the first color-difference component image data.

According to the above image noise reducing method, the step of creating the first luminance component image data is a process for reducing block noise due to luminance difference, and the step of creating the third luminance component image data is a process for reducing mosquito noise due to color difference. Also, the step of creating the first color-difference component image data is a process for reducing both block noise due to color difference and mosquito noise due to color difference.

The block noise reducing step is performed prior to the CCD noise reducing step. This is because if the CCD noise reducing step, which is a smoothing process, is performed prior to the block noise reducing step, block noise is entirely smoothened by this CCD noise reducing step and therefore it is hard to reduce only block noise in the subsequent block noise reducing step. The block noise reducing step is performed prior to the mosquito noise reducing step. This is because if the mosquito noise reducing step, which is also a smoothing process, is performed prior to the block noise reducing step, block noise is entirely smoothened by this mosquito noise reducing step and therefore it is hard to reduce only block noise in the subsequent block noise reducing step. The mosquito noise reducing step is performed prior to the CCD noise reducing step. This is because if the CCD noise reducing step is performed prior to the mosquito noise reducing step, mosquito noise is smoothened by this CCD noise reducing step and therefore it is hard to reduce only mosquito noise in the subsequent mosquito noise reducing step. Therefore, it is necessary to perform the block noise reducing step, the mosquito noise reducing step and the CCD noise reducing step in this order for the purpose of properly reducing all types of noise.

Thus, with this method, it is possible to properly reduce all of block noise, mosquito noise and CCD noise. Furthermore, the image noise reducing method of the present invention is performed so that the luminance component image data and the color-difference component image data are processed independently of each other. As a result, it is expected to more securely reduce image noise.

In the mosquito noise reducing process, not only the second luminance component image data is created, but also the third luminance component image data is created by combining the corrected edge image data created from the edge image data with the second luminance component image data. This is because only a small luminance difference can be smoothened while not greatly smoothing a contour of a large luminance difference, that is, mosquito noise can be reduced without deterioration of the image quality by combining the second luminance component image data having its luminance smoothened, with the corrected edge image data.

In the image noise reducing method of the present invention, clipped values may be used in the third filtering step to have absolute values of the differences in pixel value of each pixel of the filtering range relative to the target value kept within a given threshold value. That is, the third filtering step is performed only for the boundaries of the blocks so that excessive smoothing causes unnatural (discontinuous) blocks with the boundaries thereof blurred and hence unintentionally emphasizes block noise. In a case where an edge of one block is bright while an edge of an adjacent block is dark, the filtering process may cause excessive correction which exceeds original pixel values. The clipped values are used as the pixel value of the nearby pixels in order to avoid these problems.

In the image noise reducing method of the present invention, the corrected edge image data may be created by determining a difference from a maximum difference value and a minimum difference value in the edge image data so that where the difference is greater than a threshold value, each difference value of the edge image data is subtracted or added by a given adjusting value so as to have its absolute value decreased to 0 or greater. Where the difference is greater than the given threshold value, it indicates the possibility that a contour having a great luminance difference exists in the image and therefore mosquito noise is highly likely to have emerged. In order to address this, each difference value of the edge image data is subtracted or added by the given adjusting value so as to have its absolute value (a luminance difference at its point) decreased. All the difference values of the edge image data are designated as objects to be corrected (which means that the regions with no mosquito noise emerged are corrected), for the reason that if both regions which have been corrected and regions which have not been corrected exist in a block, its boundaries are likely to be noticeable. However, of the difference values of the edge image data, those having absolute values being equal to or lower than the given image edge adjusting value are set at "0" in order to prevent excessive correction for them.

Furthermore, in creating the corrected edge image data of the image noise reducing method of the present invention, each difference value of the edge image data may be multiplied by a given adjusting value where the difference is equal to or lower than the threshold value. For the difference being equal to or lower than the threshold value, that is a flat block with less contours existing in the image, it is not meant that there is very little possibility that mosquito noise has emerged. In order to address this, each difference value of the edge image data is multiplied by the given adjusting value to entirely reduce the luminance difference. However, the reduction ratio is set to be relatively moderate compared with a case where the difference is greater than the given threshold.

In the image noise reducing method of the present invention, the second filtering step or the fifth filtering step is preferably applied to offset data created by creating difference data by calculating the difference between the pixel value of each target pixel and the pixel value of each pixel within the filtering range and clipping the difference data at an upper limit and a lower limit in a given upper-lower-limit table. According to the visual characteristics, the human eye is not sensitive to color difference. Therefore, no specific problem may arise even when the fifth filtering step is applied to the color-difference component image data itself. However, by first creating the offset data from the color-difference component image data and then applying the fifth filtering step thereto, occurrence of unnecessary color blurring can be properly prevented.

In the image noise reducing method of the present invention, the given upper-lower-limit table may be created so that for an input value having an absolute value lower than a given threshold value, this input value is designated as an output value, and for an input value having an absolute value equal to or greater than the given threshold value, a threshold value of the same code as that of this input value is designated as an output value.

BRIEF DESCRIPTION OF THE DRAWINGS

The above, and other objects, features and advantages of the present invention will become apparent from the detailed description thereof in conjunction with the accompanying drawings wherein.

FIG. 5A illustrates a case in which the width of the image data is a multiple of the width of a block, and FIG. 5B illustrates a case in which the width of the image data is not a multiple of the width of a block.

FIG. 6A illustrates a case in which the height of the image data is a multiple of the height of a block, and FIG. 6B illustrates a case in which the height of the image data is not a multiple of the height of the block.

FIGS. 7A and 7B are flowcharts of the block noise reducing process of FIG. 3, in which FIG. 7A is for a luminance component image data and FIG. 7B for a color-difference component image data.

FIGS. 8A and 8B are explanatory views of the block noise reducing process in the vertical direction, in which FIG. 8A illustrates a state in which a filtering process is to be performed and FIG. 8B illustrates a state in which vertical block noise has been reduced.

FIGS. 9A and 9B are explanatory views of the block noise reducing process in the horizontal direction, in which FIG. 9A illustrates a state in which a filtering process is to be performed and FIG. 9B illustrates a state in which horizontal block noise has been reduced.

FIG. 11C: offset data, FIG. 11D: offset data and FIG. 11E illustrates a state in which the pixel value of a target pixel has been replaced.

FIGS. 14A and 14B are flowcharts of a CCD-noise reduction process of FIG. 3, in which FIG. 14A is for a process to the luminance component image data and FIG. 14B is for a process to the color-difference component image data.

DETAILED DESCRIPTION OF THE PREFERRED EMBODIMENT

Figure 1:
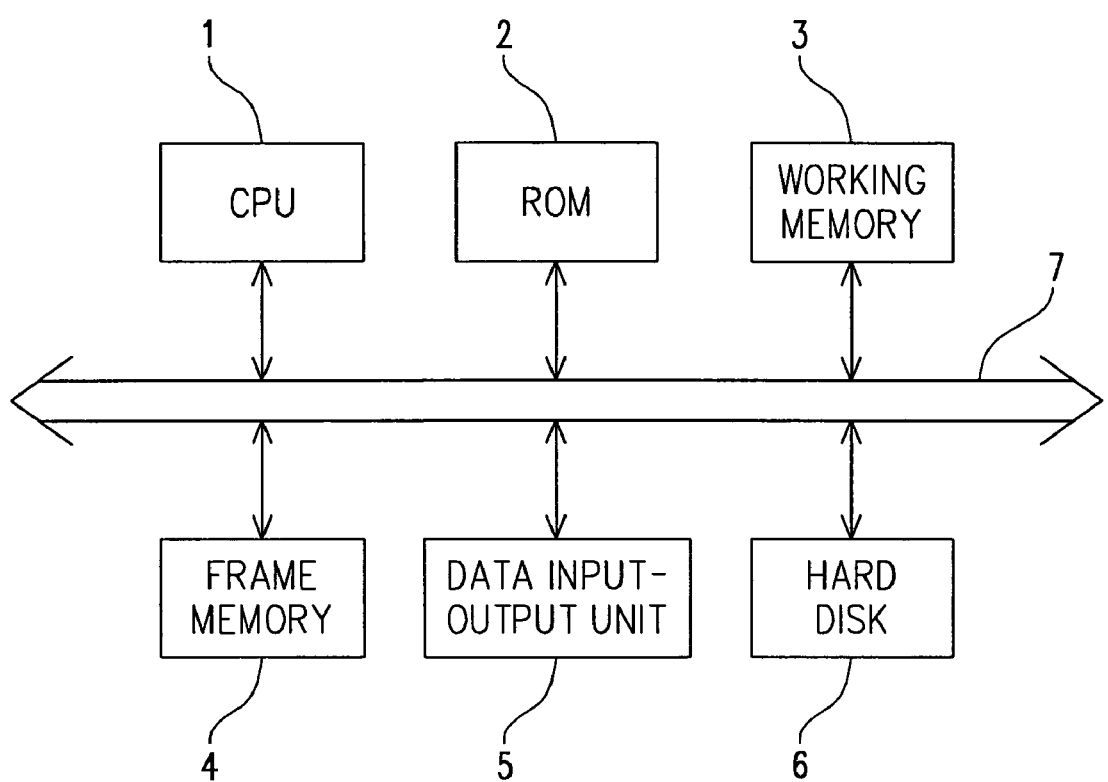
FIG. 1 is a structural view of an image processing apparatus according to one embodiment of the present invention.

Now, the description will be made for the structure of an image processing apparatus that realizes the method of reducing noise in images according to one embodiment of the present invention with reference to the drawings attached hereto. The image processing apparatus comprises a computer with a CPU 1, a ROM 2, a working memory 3, a frame memory 4, a data input-output unit 5 and a hard disk 6, which are all connected to a bus 7. The ROM 2 serves to store an image noise reducing program, other computer programs and various parameters, while the working memory 3 that is required for realizing control by the CPU contains such as a buffer and register. The CPU 1 performs various calculations and processes based on computer programs stored in the ROM 2.

The frame memory 4 is a memory for storing image data obtained by decoding a still image compressed and encoded in JPEG format. Image data (R, G, B) inputted in the data input-output unit 5 are once stored respectively in separate frame memories 4, as R component image data, G component image data and B component image data, and then the image noise reducing process is performed. Upon the finish of the image noise reducing process, the (R, G, B) image data are outputted to the outside via the data input-output unit 5 or stored in the hard disk 6.

Figure 2:
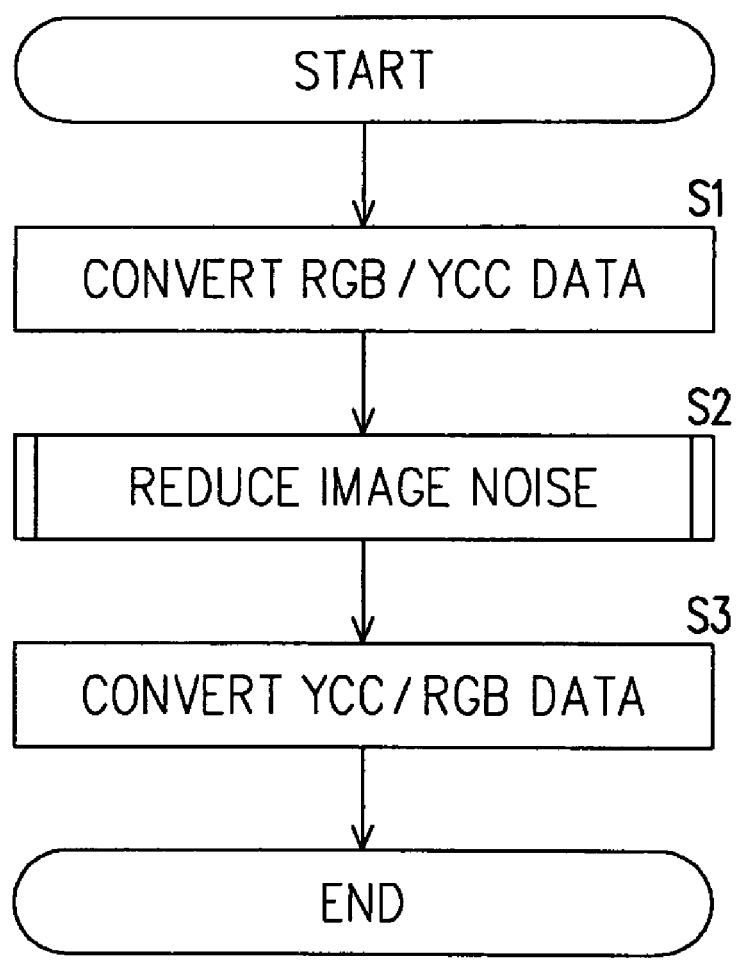
FIG. 2 is a flowchart of the image processing of this embodiment.

As illustrated in FIG. 2, in the image noise reducing process, a RGB/YCC data conversion process (S1) is first performed and then an image noise reducing process (S2) is performed for block noise, mosquito noise and CCD noise in this order. In the RGB/YCC data conversion process, the (R, G, B) image data are color converted into (Y, Cr, Cb) image data based on the following equations (Eq. 1-Eq. 3). The reason why the data are converted into YCC color space is that block noise and mosquito noise are generated when the JPEG format performs compression/expansion in YCC color space and therefore correction accuracy is improved when the image noise reducing process is performed in the same color space; and moreover, effective noise reduction can be generally achieved for CCD noise by applying proper corrections independently to luminance and color.

$$Y=(RToY[0][0]\times R+RToY[0][1]\times G+RToY[0][2]\times B)/10000 \quad (1)$$

$$Cr=(RToY[1][0]\times R+RToY[1][1]\times G+RToY[1][2]\times B)/10000+2048 \quad (2)$$

$$Cb=(RToY[2][0]\times R+RToY[2][1]\times G+RToY[2][2]\times B)/10000+2048 \quad (3)$$

RToY[i][j]:YCrCb conversion coefficient

Upon the finish of the image noise reducing process (S2), a YCC/RGB data conversion process (S3) is performed based on the following equations (Eq. 4-Eq. 6) to return the (Y, Cr, Cb) image data to the (R, G, B) image data. Thus, a series of the processes are finished.

$$R=(YToR[0][0]\times Y+YToR[0][1]\times (Cr-2048)+YToR[0][2]\times (Cb-2048)/10000 \quad (4)$$

$$G=(YToR[1][0]\times Y+YToR[1][1]\times (Cr-2048)+YToR[1][2]\times (Cb-2048)/10000 \quad (5)$$

$$B=(YToR[2][0]\times Y+YToR[2][1]\times (Cr-2048)+YToR[2][2]\times (Cb-2048)/10000 \quad (6)$$

YToR[i][j]:Y coupling coefficient

In this embodiment, in order to limit data loss due to the above processing, the density data format is upgraded from 8 bit to 12 bit, although it is possible to keep the density data format in 8 bit.

Figure 3:
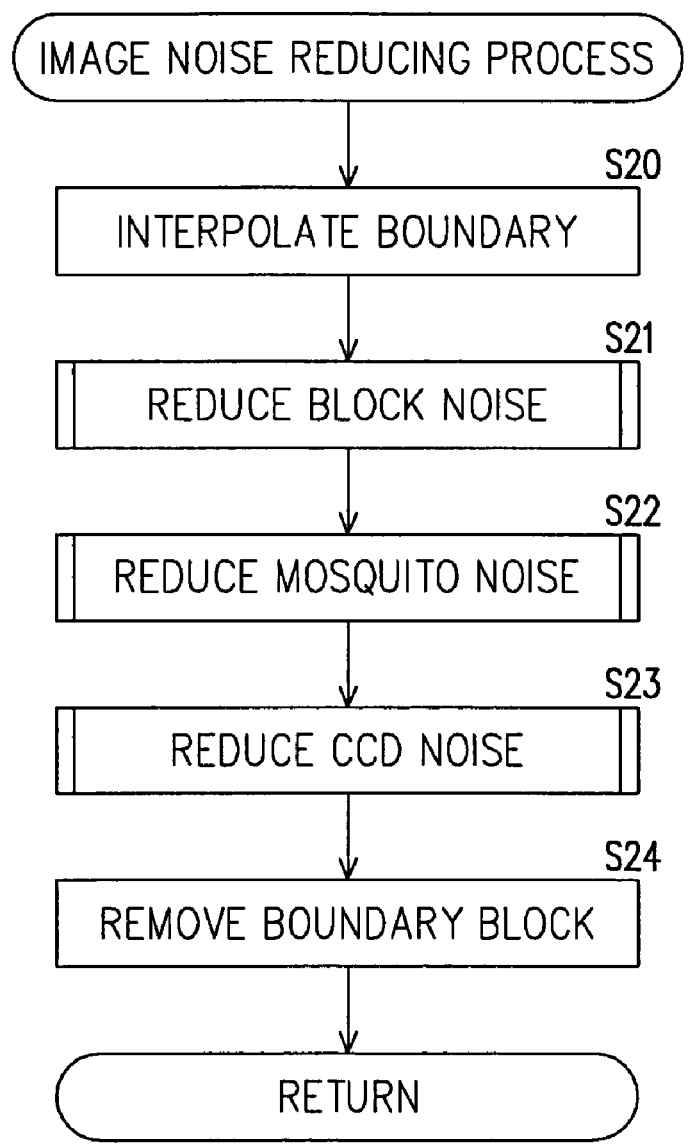
FIG. 3 is a flowchart of an image noise reducing process of FIG. 2.

As illustrated in FIG. 3, in the image noise reducing process of S2, a boundary interpolation step (S20) is performed, and then a block noise reducing step (S21), a mosquito noise reducing step (S22) and a CCD noise reducing step (S23) are subsequently performed. The boundary interpolation step (S20) is performed for the purpose of interpolating pixel data on the boundaries of the blocks of the image data at the time of performing a later-described filtering step to three image data sets (Y-image data of (Y, Cr, Cb) image data (hereinafter referred to "luminance component image data"), Cr-image data and Cb-image data (hereinafter respectively referred to "color-difference component image data")).

Figure 4:
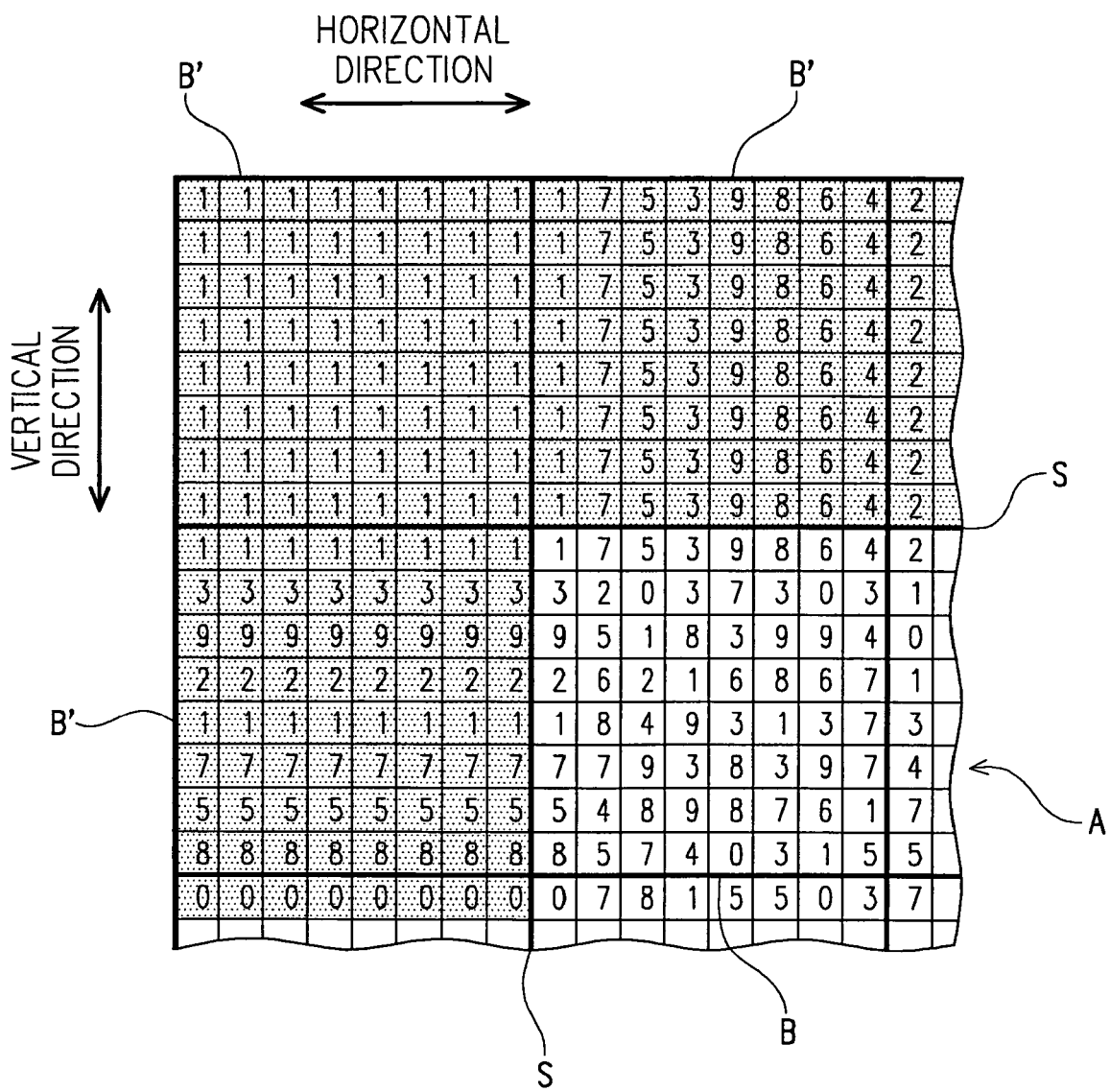
FIG. 4 is an explanatory view illustrating a state in which boundary lines have been added to an image data.

Specifically, as illustrated in FIG. 4, which illustrates any one of the image data sets (each grid and a numerical value in each grid respectively representative of a pixel and a pixel value), the boundary interpolation step (S20) adds to boundaries S of blocks B to be encoded and decoded (non-hatched blocks defined with thick frame) of image data A (a non-hatched portion), blocks B' (hatched blocks with thick frame) each having the same size as the size of each block B respectively in the vertical and horizontal directions, and embeds the pixel values of the pixels on the boundaries of the image data A in the grids (pixel values) of the blocks B'. These added blocks B' are removed in a boundary block removing step (S24) upon the finish of the block noise reducing step (S21), the mosquito noise reducing step (S22) and the CCD noise reducing step (S23).

Figure 5A:
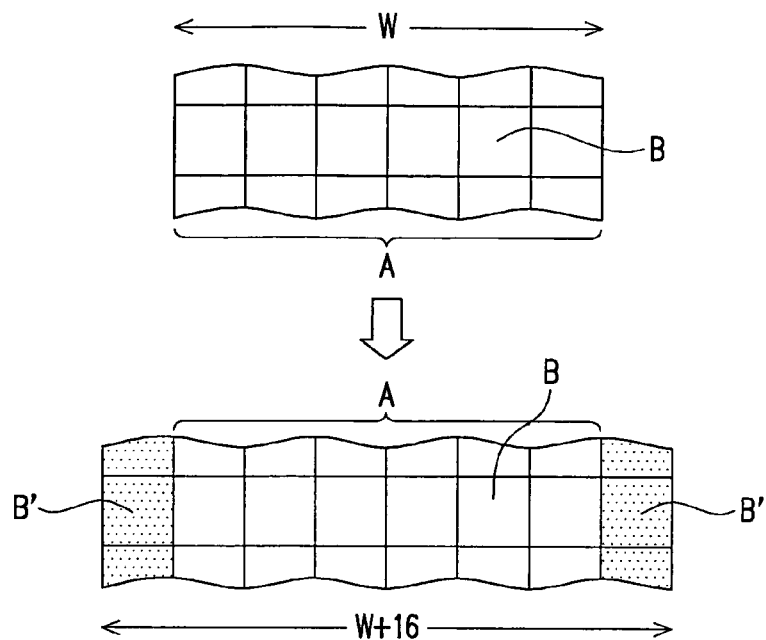
FIGS. 5A and 5B are explanatory views illustrating a state in which boundary lines have been added to image data along the horizontal axis. Specifically.
Figure 5B:
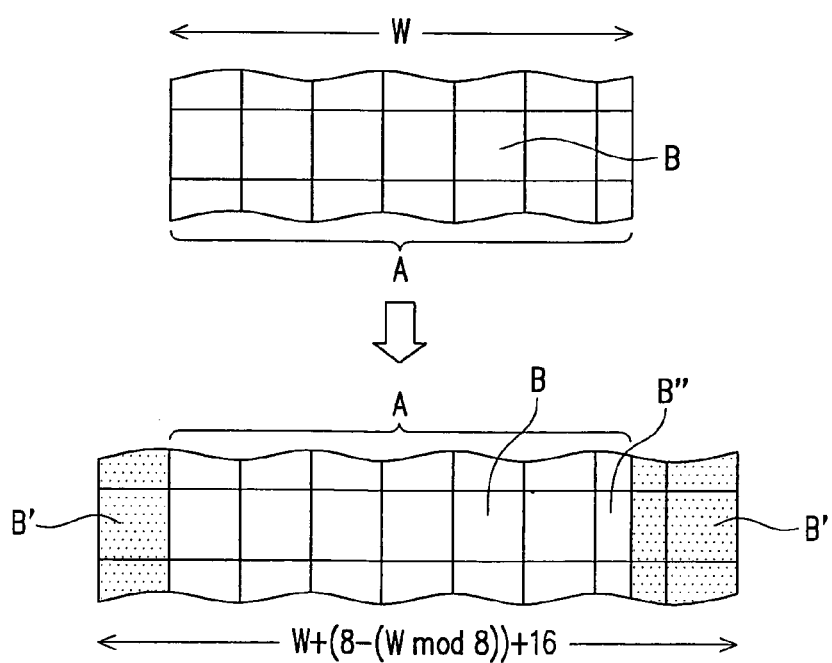

As illustrated in FIG. 5A, in a case where the length (number of pixels) W of the image data A along the horizontal axis is a multiple of the width (number of pixels) of the block B along the horizontal axis, or a multiple of 8, the blocks B' are added so as to allow each row to have a overall length (number of pixels) of [W+15]. Otherwise (when not a multiple of 8), the blocks B' and a surplus are added so as to allow each row to have a overall length (number of pixels) of [W+(8−(W mod 8))+16], thus achieving data interpolation to a surplus B" of the multiple of 8, as illustrated FIG. 5B.

Figure 6A:
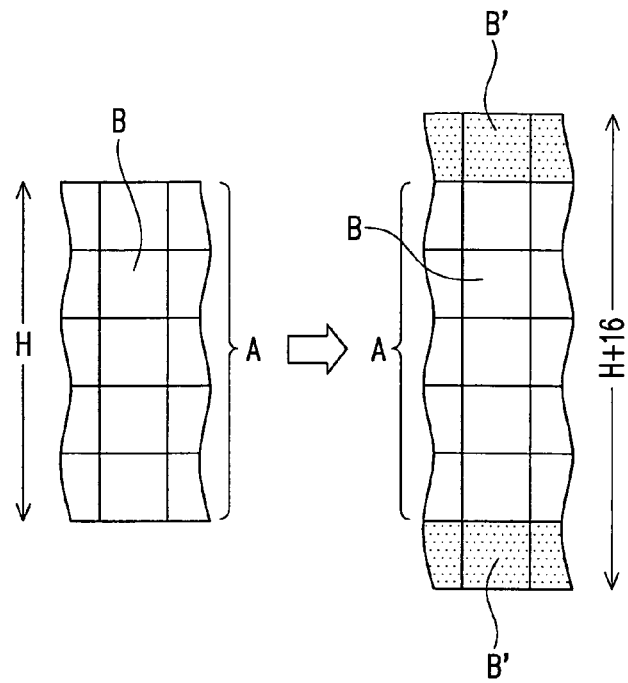
FIGS. 6A and 6B are explanatory views illustrating a state in which boundary lines have been added to image data along the vertical axis. Specifically.
Figure 6B:
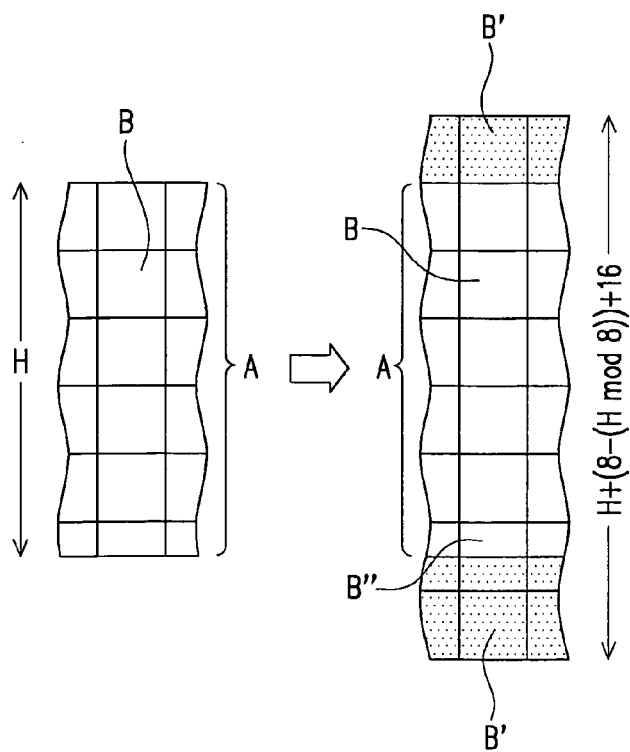

Similarly, as illustrated in FIG. 6A, in a case where the length (number of pixels) H of the image data A along the vertical axis is a multiple of the length (number of pixels) of the block B along the vertical axis, or a multiple of 8, the blocks B' are added so as to allow each column to have a overall length (number of pixels) of [H+16]. Otherwise (when not a multiple of 8), the blocks B' and a surplus are added so as to allow each column to have a overall length (number of pixels) of [H+(8−(H mod 8))+16], thus achieving data interpolation to a surplus B" of the multiple of 8, as illustrated FIG. 6B.

Figure 7A:
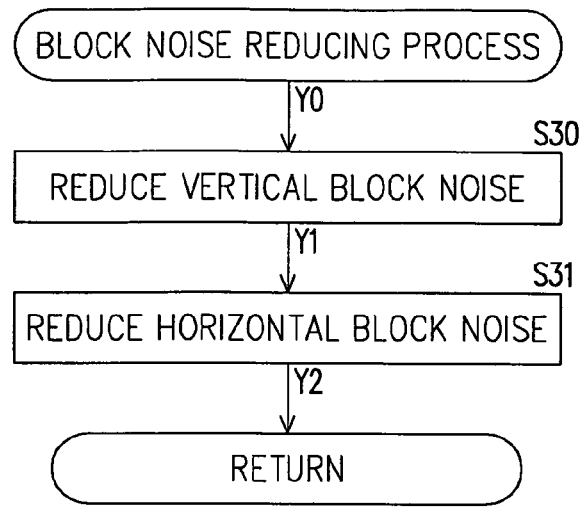
Figure 7B:
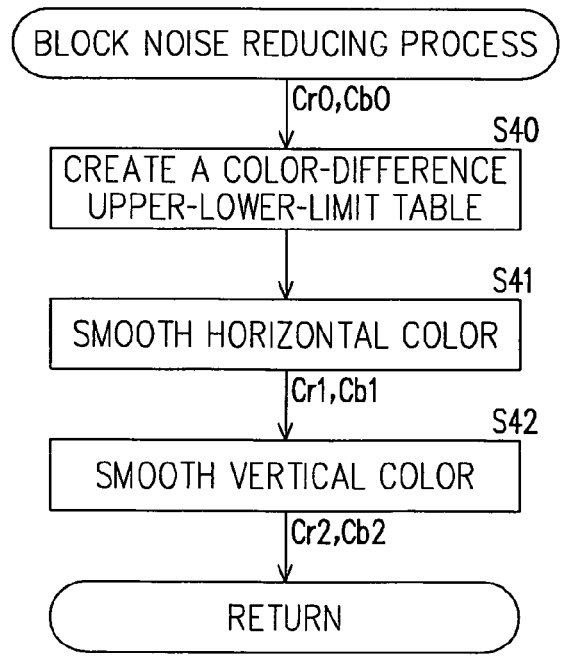

The block noise reducing step (S21) is to create luminance component image data Y1 for luminance component image data Y0 by performing a vertical block noise reducing step (S30) and then create luminance component image data Y2 (first luminance component image data of the present invention) by performing a horizontal block noise reducing step (S31), as illustrated in FIG. 7A. On the other hand, as illustrated in FIG. 7B, for each of color-difference component image data Cr0, Cb0, a color-difference upper-lower-limit table creation step (S40) is performed. Then, a horizontal color smoothing step (S41) is performed to create color-difference component image data Cr1, Cb1, and then a vertical color smoothing step (S42) is performed to create color-difference component image data Cr2, Cb2 (first color-difference component image data of the present invention).

The Vertical Block Noise Reducing Step (S30)

A one-dimensional filter in a horizontal direction is applied to image data with a pixel on the boundaries of the blocks being designated as a target pixel, thereby creating the luminance component image data Y1 that has a luminance difference in the horizontal direction of luminance component image data Y0 eliminated or smoothened in the boundaries of the blocks. The filter size can be set to such as 3 pixels or 5 pixels (see FIG. 8A, in which a dense dot pattern C, a thin dot pattern D and a thinner dot pattern E respectively represent a target pixel, a filtering range and pixels to be filtered), and a filtering step (a third filtering step of the present invention) is performed by using the following equation (Eq. 7).

$$Y1 = \frac{\sum Fb \times Yi}{\sum Fb} \quad (7)$$

This filter is a weighting filter by matrix Fb (e.g., Fb=(1 3 1)) in which a coefficient to a target value is about 10-20 times greater than a coefficient to the other pixels, and is made based on an equation in which coefficients of the matrix Fb are respectively multiplied by pixel values (Yi) within the filtering range with the target pixel C designated as the center and the results are summed up, and then the sum is divided by the sum of the coefficients of the matrix Fb.

The above filtering process, targets of which are only the boundaries between the blocks, may cause an unnatural (discontinuous) block with the boundaries thereof blurred and hence unintentionally emphasize block noise when smoothing is excessively made, and may cause excessive correction which exceeds original pixel values in a case where an edge of one block is bright while an edge of an adjacent block is dark. In order to avoid this problem, in the above equation (Eq. 7), clipped (gap-processed) values are used to meet the requirements of the following equation (Eq. 8), that is, to have absolute values of the differences in pixel value relative to the target value C kept within a threshold value b.

$$Yi[x,y]-b \leq Yi'[x-1,y] \leq Yi[x,y]+b \quad (8)$$

The threshold value b is for example 30 so that the pixel values of pixels E on the boundaries of the blocks are converted from the values of FIG. 8A into the values of FIG. 8B, from which it has been found that the difference in pixel value (luminance difference) in the boundaries of the blocks became smaller.

The Horizontal Block Noise Reducing Step (S31)

A one-dimensional filter in a vertical direction is applied to image data with a pixel on the boundaries of the blocks being designated as a target pixel, thereby creating the luminance component image data Y2 that has a luminance difference in the vertical direction of the luminance component image data Y1 eliminated or smoothened in the boundary of the blocks. The processing is substantially the same as in the vertical block noise reducing step.

The threshold value b is for example 30 so that the pixel values of pixels E on the boundaries of the blocks are converted from the values of FIG. 9A into the values of FIG. 9B, from which it has been found that the difference in pixel value (luminance difference) in the boundaries of the blocks became smaller.

Thus, the above two block noise reducing steps are performed for the purpose of reducing the luminance difference in the boundaries of the blocks both in the vertical and horizontal directions by finally creating the luminance component image data Y2 (FIG. 9B) from the luminance component image data Y0 (FIG. 8A). According to the visual characteristics, the human eye is very sensitive to the luminance difference and therefore block noise results mainly from the luminance difference among pixels on the boundaries of the blocks. In light of this, the above two block noise reducing steps are very effective processes that can reduce block noise. However, block noise results not only from the luminance difference but also from the color difference to some extent. In order to completely reduce block noise resulting from these differences, the following color smoothing steps (S41, S42) will be needed.

The Color-Difference Upper-Lower-Limit Table Creation Step (S40)

In the color smoothing steps, a relatively large filter (hereinafter described) is used so that where excessive smoothing is made, colors are blurred. For example, where color smoothing is made in great span extending for example from a red of the lips to the skin of a person in image data, the colors are blurred. In order to avoid this problem, the color-difference upper-lower-limit table is used in the color smoothing steps (S41, S42).

Figure 10:
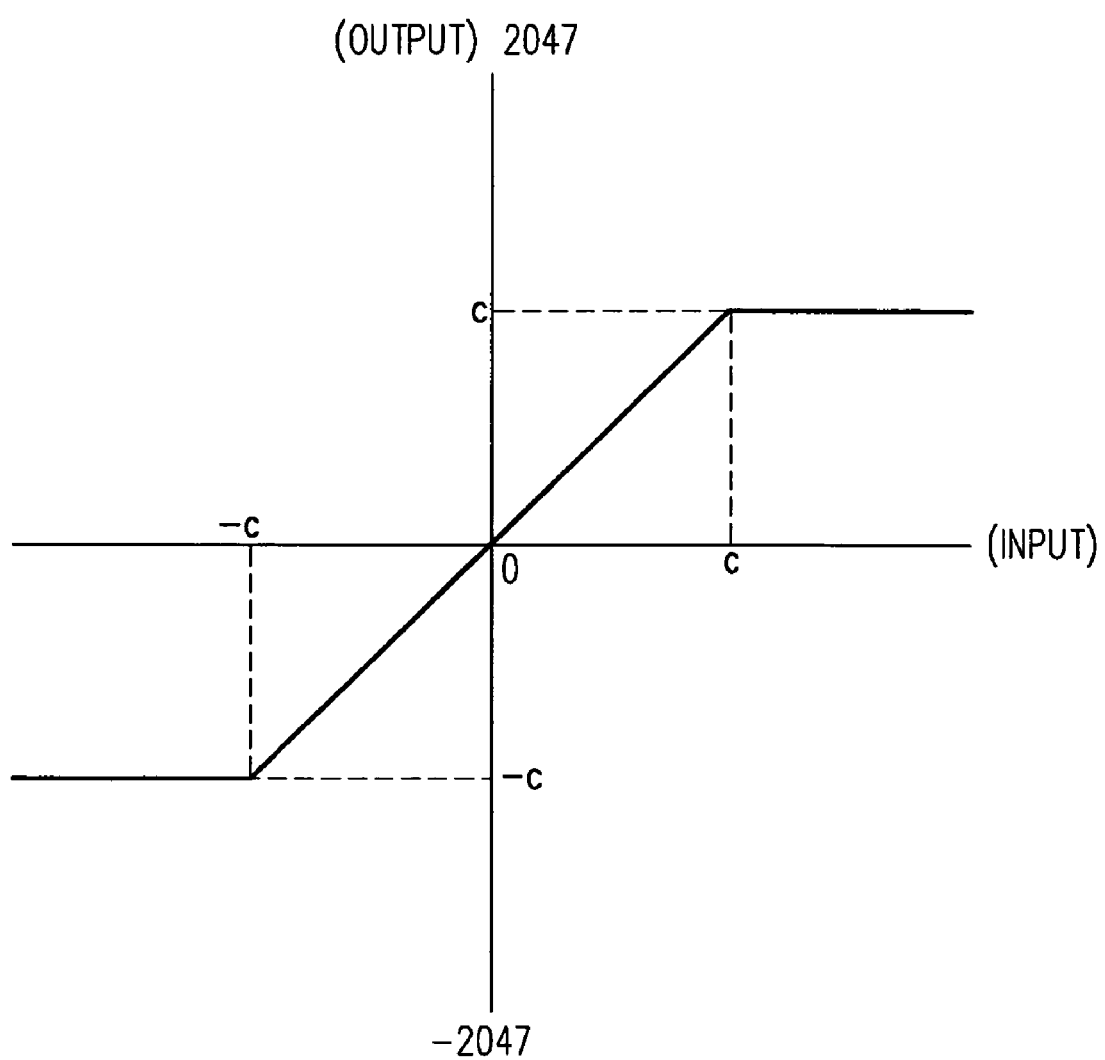
FIG. 10 is an explanatory view of an upper-lower-limit table of the color difference for use in the block noise reducing process to the color-difference component image data of FIG. 3.

The color-difference upper-lower-limit table is a table for calculation of mask values (see FIG. 10). A reference code "c" represents a threshold value for the upper and lower limits of an output color difference, and lies in the range of 0-4095. According to this table, for input values falling in the range of −c to c, the corresponding or equivalent values are outputted, while for input values lower than −c, all are set to −c and then this −c is outputted, and for input values greater than c, all are set to c and this c is outputted.

The Horizontal Color Smoothing Step (S41)

A one-dimensional filter in a horizontal direction is applied to image data with each pixel of a block being designated as a target pixel, thereby creating color-difference component image data Cr1, Cb1, each having colors of color-difference component image data Cr0, Cb0 smoothened in the horizontal direction. The filter size can be set to such as 7 pixels (see FIG. 11A, in which a thick frame C represents a target pixel).

Figure 11A:
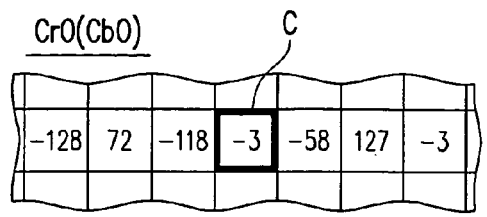
FIGS. 11A-11E are explanatory views of the block noise reducing process to the color-difference component image data of FIG. 3, in which FIG. 11A:color-difference component image data, FIG. 11B:difference value data.
Figure 11B:
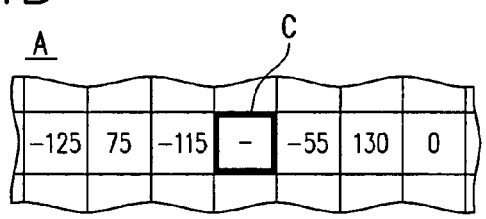
Figure 11C:
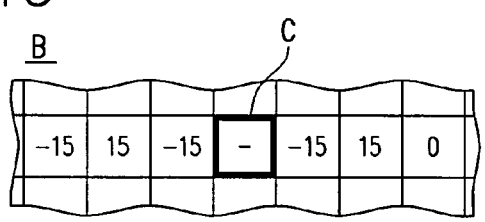
Figure 11D:
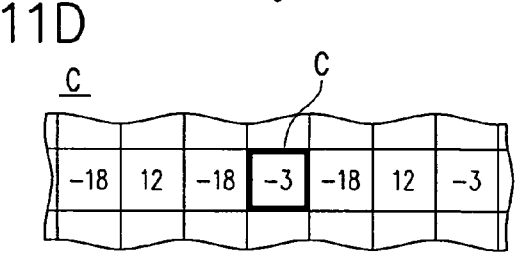
Figure 11E:
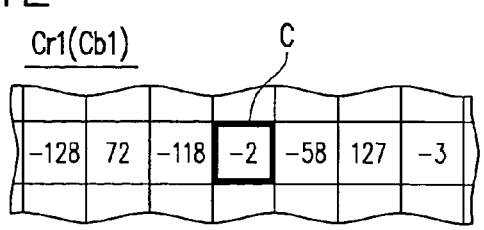

Upon calculation of the difference (−2047 to 2047) between the target pixel C and a nearby pixel, difference data (A) is created (FIG. 11B). Then, offset data (B) is created by having this difference data (A) clipped at an upper limit and a lower limit in the upper-lower-limit table (a threshold value c: e.g., 15) (FIG. 11C). Then, upon creation of offset data (C) by returning the pixel value of a target pixel C to the target pixel C of this offset data (B) (FIG. 11D), a filtering step (a fifth filtering step of the present invention) is performed by using the following equation (Eq. 9) (FIG. 11E).

$$Cr1, Cb1 = \frac{\sum Fc \times Ci}{\sum Fc} \qquad (9)$$

This filter is a moving average filter by matrix Fc (Fc= (1 ... 1)) having an equal coefficient, and is made based on an equation in which the coefficient of the matrix Fc is multiplied by respective offset values (Ci) with the target pixel C designated as the center and the results are summed up, and the sum is divided by the sum of the coefficients of the matrix Fc (this moving average filter necessitates the sum of the coefficients to be equal to the filter size). This filtering step is performed for every pixel.

The Vertical Color Smoothing Step (S42)

A one-dimensional filter in a vertical direction is applied to image data with each pixel of a block being designated as a target pixel, thereby creating color-difference component image data Cr2, Cb2, each having colors of color-difference component image data Cr1, Cb1 smoothened in the vertical direction. The processing is substantially the same as in the horizontal color smoothing step.

Thus, the above two color smoothing steps are performed for the purpose of smoothing or losing only small color differences while leaving a contour having a large color difference unsmoothened by finally creating the color-difference component image data Cr2, Cb2 from the color-difference component image data Cr0, Cb0 (FIG. 11A). That is, where no upper and lower limits are provided for the magnitude of the color difference, smoothing is made based on a normal moving average, thereby causing a contour having a large color difference to be blurred. Instead, where a threshold value c is set so as to have upper and lower limits lying in the fluctuation range of the magnitude of a small color difference, the magnitude of a color difference resulting from a contour having a large color difference located in the periphery is transformed to lie in the fluctuation range of the magnitude of a small color difference of a contour so as to prevent the contour having a large color difference from being blurred. Block noise due to color difference is caused by this small color difference and therefore the above two color smoothing steps are very effective processes that can reduce block noise due to color difference with no deterioration of the image quality or with making deteriorated image quality non-noticeable. The adjustment of intensity is made by properly setting the filter size of each filter and the threshold value of the upper-lower-limit table.

Figure 12:
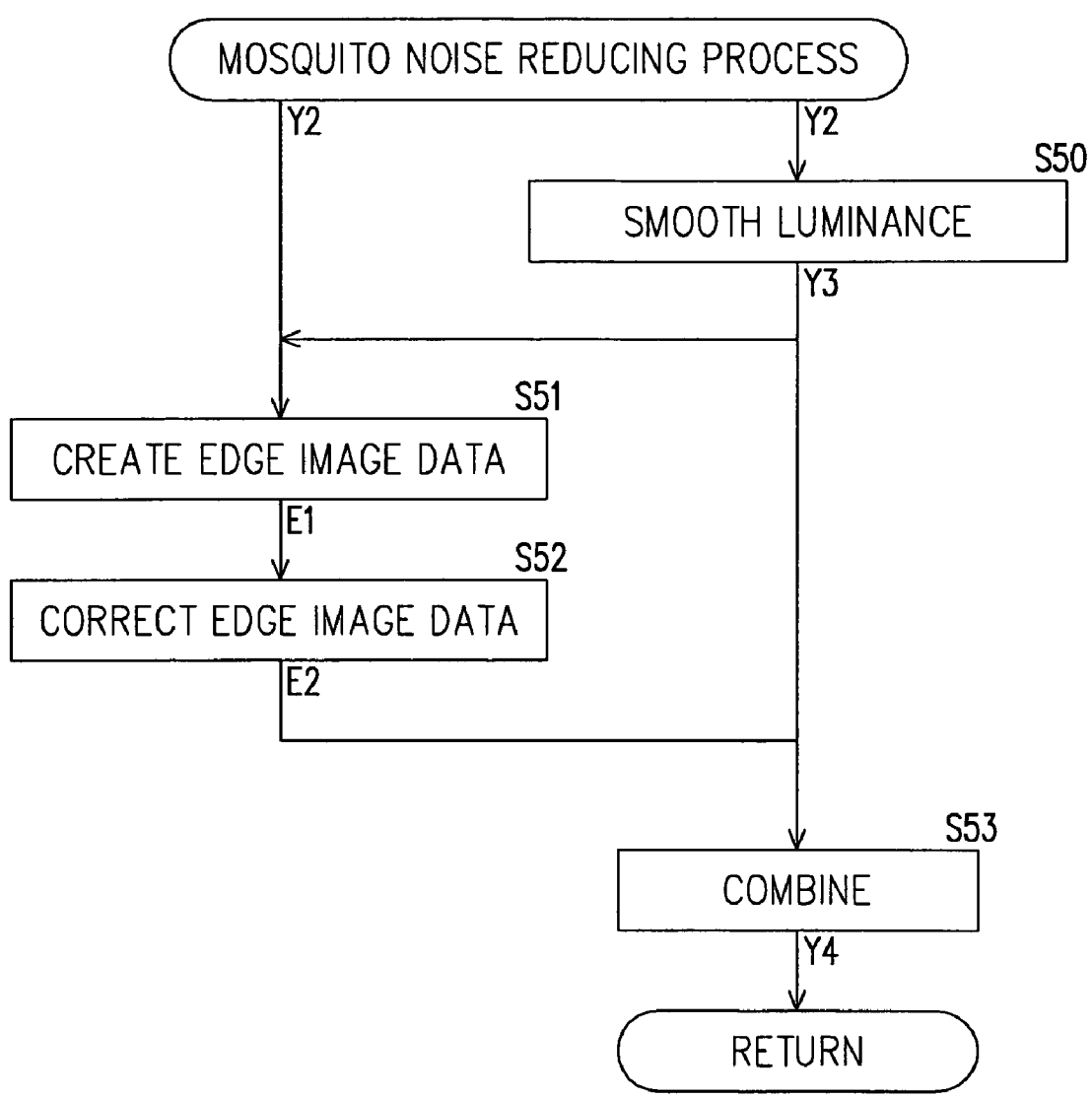
FIG. 12 is a flowchart of the mosquito noise reducing process of FIG. 3.

As illustrated in FIG. 12, the mosquito noise reducing step (S22) is to create luminance component image data Y3 (second luminance component image data of the present invention) by performing a luminance smoothing step (S50) for the luminance component image data Y2 created in the block noise reducing step of S21, then create edge image data E1 by performing an edge image data creation step (S51) based on the luminance component image data Y2, then create corrected edge image data E2 by performing edge image data correction step (S52) and then finally create luminance component image data Y4 (third luminance component image data of the present invention) by combining this corrected edge image data E2 with the luminance component image data Y3 in a step (S53).

The Luminance Smoothing Step (S50)

A two-dimensional filter is applied to image data with each pixel of a block being designated as a target pixel, thereby creating the luminance component image data Y3 that has a luminance of the luminance component image data Y2 smoothened. The filter size can be set to such as 3 by 3 pixels or 5 by 5 pixels. A filtering step (a fourth filtering step of the present invention) is performed by using the following equation (Eq. 10).

$$Y3 = Y2 + \left( \frac{\sum Fb \times Yi}{\sum Fb} - Y2 \right) \times (d/128) \qquad (10)$$

This filter is a moving average filter by matrix Fb having an equal coefficient, and is made based on an equation in which the coefficient of the matrix Fb is multiplied by respective pixel values (Yi) within the filtering range and the results are summed up; the sum is divided by the sum of the coefficients of the matrix Fb; the difference between this calculated value and the pixel value of the target pixel C is determined; this determined value is then multiplied by [d/128]; and this calculated value is added to the pixel value of the target pixel C. The "d" represents a coefficient (smoothing intensity coefficient) for adjusting the smoothing intensity. The smoothing intensity coefficient d is divided by 128 because the smoothing intensity coefficient d is previously multiplied by [128/100] for high speed processing.

The Edge Image Data Creation Step (S51)

Figure 13:
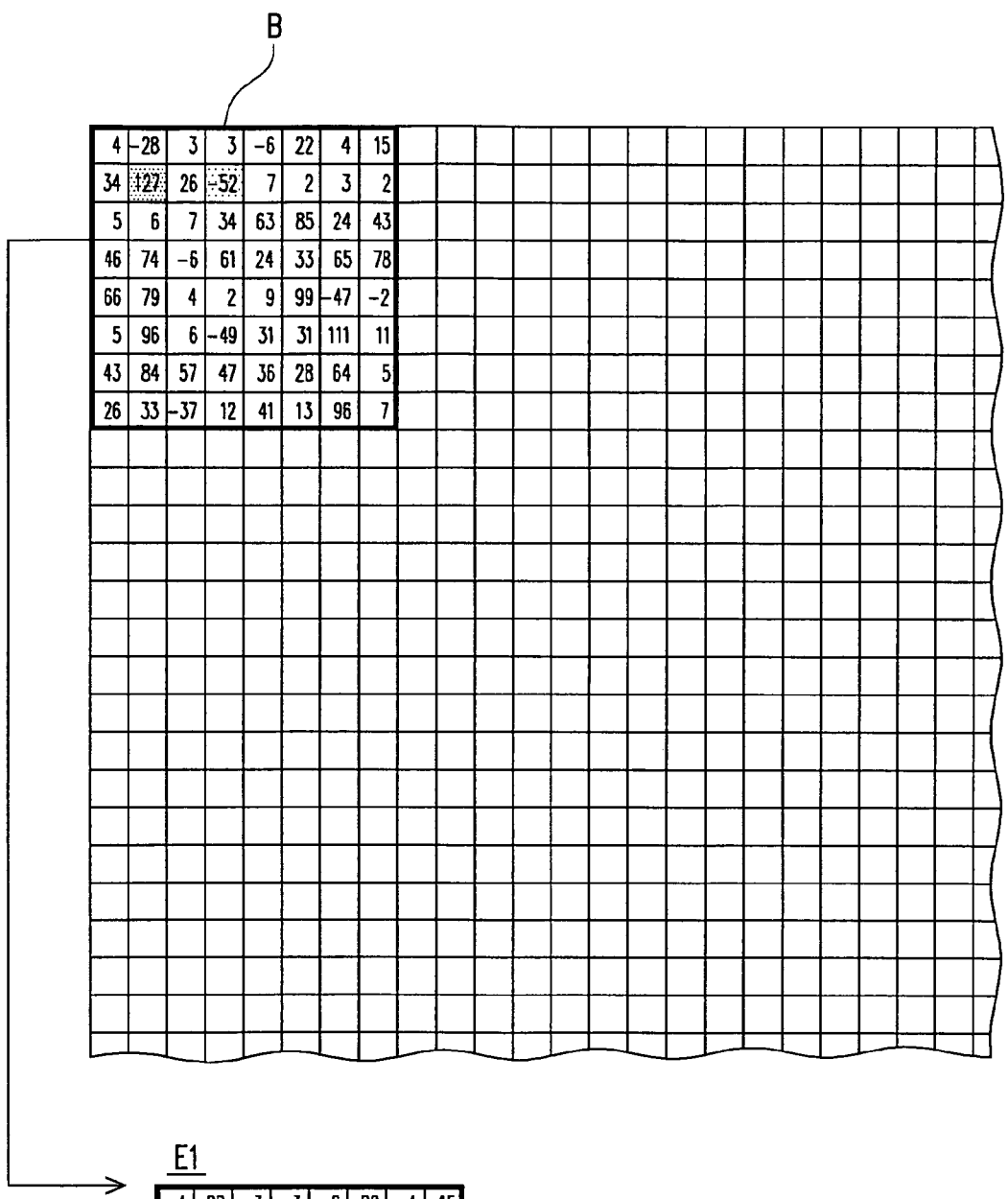
FIG. 13 is an explanatory view of the edge image creation step of FIG. 12.

The edge image data E (see FIG. 13) is created for each block B by using the following equation (Eq. 11), in which the data is clipped to the range of −2048 to 2047.

$$E1 = Y2 - Y3 \qquad (11)$$

That is, the edge image data E1 is created by subtracting each pixel value of the luminance component image data Y3 created in the luminance smoothing step (S50) from a corresponding pixel value of the luminance component image data Y2.

The Edge Image Data Correction Step (S52)

A difference SA is determined from the maximum difference value and the minimum difference value in the edge image data E1 and corrected edge image data E2 is created by using the following equation (Eq. 12).

$$SA > e \rightarrow E2 = \begin{cases} E1 - f & [f < E1] \\ 0 & [|E1| \le f] \\ E1 + f & [E1 < -f] \end{cases} \qquad (12)$$

$$SA \le e \rightarrow E2 = E1 \times (1/g)$$

Where the difference SA is greater than a threshold value e, it indicates the possibility that a contour having a great luminance difference exists in the image and therefore mosquito noise is highly likely to have emerged. In order to address this case based on the above equation (Eq. 12), the following calculation is made. That is, mosquito noise emerges in a region having an excessively large luminance difference and therefore each difference value of the edge image data E1 is subtracted or added by an image edge adjusting value "f" of mosquito noise so as to have its absolute value (a luminance difference at its point) decreased. All the difference values of the edge image data E1 are designated as objects to be corrected (which means that the regions with no mosquito noise emerged are also corrected), for the reason that if both regions which have been corrected and regions which have not been corrected exist in a block, its boundaries are likely to be noticeable. However, of the difference values of the edge image data E1, those having absolute values being equal to or lower than the image edge adjusting value f are set at "0" in order to prevent excessive correction for them.

For the difference SA being equal to or lower than the threshold value, that is, a flat block with less contours existing in the image, it is not meant that there is very little possibility that mosquito noise has emerged. In order to address this case based on the above equation (Eq. 12), the following calculation is made. That is, all the individual difference values of the edge image data E1 are multiplied by [1/an image edge adjusting value "g" of a normal image] to entirely reduce the luminance difference. However, the reduction ratio is set to be relatively moderate compared with a case where the difference SA is greater than the threshold value.

The threshold value e is for example 10, while the image edge adjusting value f of mosquito noise and the image edge adjusting value g of the normal image g are each for example 5. With these values applied, in a case of FIG. 13, the difference SA is 179 so that a target pixel (difference value: −4) at the upper left corner is: 4−5=−1→0 after the correction, its adjacent target pixel (difference value: −28) is: −28+5=−23, . . . a target pixel (difference value: 7) at the lower right corner is: 7−5=2 after the correction. Thus, the corrected edge image E2 with the luminance differences entirely reduced is created.

The Combining Step (S53)

The luminance component image data Y4 is created by performing a combining step by using the following equation (Eq. 13), in which the data is clipped to the range of 0 to 4096.

$$Y4 = Y3 + E2 \tag{13}$$

That is, the luminance component image data Y4 is created by adding each offset value of the corrected edge image data E2 created in the edge image data correction step of S52 to its corresponding pixel value of the luminance component image data Y3.

The above mosquito noise reducing process is to finally create the luminance component image data Y4 from the luminance component image data Y2, thus smoothing or losing only small luminance differences while leaving contours having a large luminance difference unsmoothened (this is because the luminance difference is originally large and therefore smoothing is not noticeable). Mosquito noise is caused by this small luminance difference and therefore the above mosquito noise reducing process is effective in reducing mosquito noise with no deterioration of the image quality or with making deteriorated image quality non-noticeable.

Figure 14A:
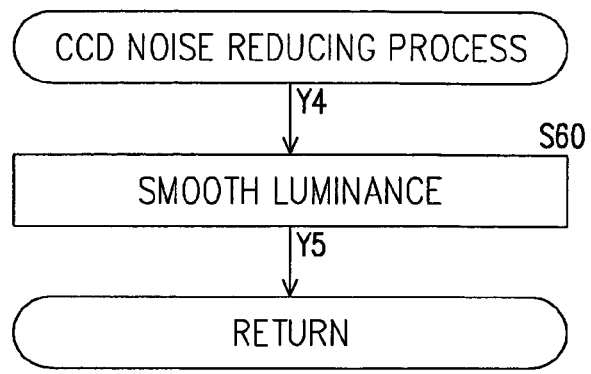
Figure 14B:
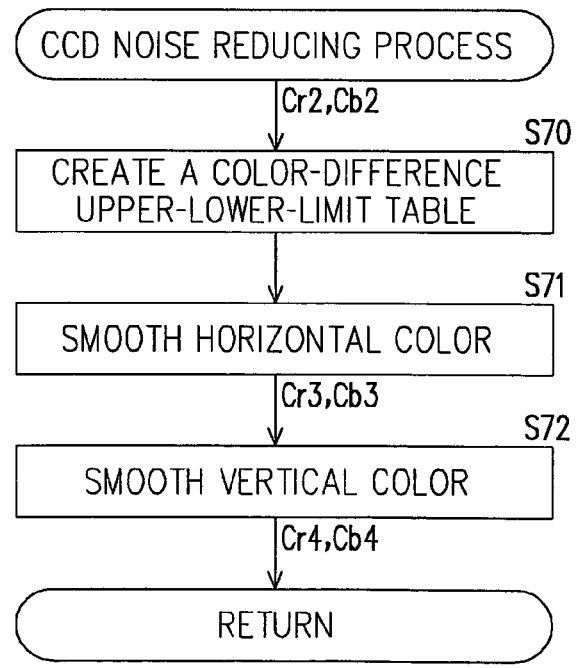

In the CCD noise reducing step of S23, a luminance smoothing step (S60) is performed to create luminance component image data Y5 for the luminance component image data Y4 created in the mosquito noise reducing step of S22, as illustrated in FIG. 14A. On the other hand, for the color-difference component image data Cr2, Cb2 created in the block noise reducing step of S21, a color-difference upper-lower-limit table creation step (S70) and then a horizontal color smoothing step (S71) are subsequently performed, thereby creating color-difference component image data Cr3, Cb3, and then a vertical color smoothing step (S72) is performed, thereby creating color-difference component image data Cr4, Cb4, as illustrated in FIG. 14B.

The Luminance Smoothing Step (S60)

A two-dimensional filter is applied to image data with each pixel of a block being designated as a target pixel, thereby creating the luminance component image data Y5 that has a luminance of the luminance component image data Y4 smoothened. The filter size can be set to such as 3 by 3 pixels, 5 by 5 pixels, 7 by 7 pixels or 9 by 9 pixels. A filtering step (a first filtering step of the present invention) is performed by using the following equation (Eq. 14).

$$Y5 = Y4 + \left( \frac{\sum Fb \times Yi}{\sum Fb} - Y4 \right) \times (h/128) \tag{14}$$

This filter is a moving average filter by matrix Fb having an equal coefficient, and is made based on an equation in which the coefficient of the matrix Fb is multiplied by respective pixel values (Yi) within the filtering range and the results are summed up; the sum is divided by the sum of the coefficients of the matrix Fb; the difference between this calculated value and the pixel value of the target pixel C is determined; this determined value is then multiplied by [h/128]; and this calculated value is added to the pixel value of the target pixel C. The "h" represents a coefficient (smoothing intensity coefficient) for adjusting the smoothing intensity. The smoothing intensity coefficient d is divided by 128 because the smoothing intensity coefficient h is previously multiplied by [128/100] for high speed processing. This luminance smoothing step performs substantially the same filtering process as that of the luminance smoothing step of S50 in the mosquito noise reducing step of S22.

The Color-Difference Upper-Lower-Limit Table Creation Step (S70), Horizontal Color Smoothing Step (S71), Vertical Color Smoothing Step (S72) The substantially same process (a second filtering step of the present invention) as that of S40-S42 in the block noise reducing step of S21 is performed. Herein, the intensity and the filter size are determined depending on the degree of the deterioration of the image quality. For the image greatly deteriorated, a filter having a filter size (e.g., 15 pixels) larger than the filter used in the process of S40-S42 may be used.

Thus, the above two color smoothing steps are performed for the purpose of smoothing or losing only small color differences while leaving a contour having a large color difference unsmoothened by finally creating the color-difference component image data Cr4, Cb4 from the color-difference component image data Cr2, Cb2. That is, where no upper and lower limits are provided for the magnitude of the color difference, smoothing is made based on a normal moving average, thereby causing a contour having a large color difference to be blurred. Instead, where a threshold value c is set so as to have upper and lower limits lying in the fluctuation range of the magnitude of a small color difference, the magnitude of a color difference resulting from a contour having a large color difference located in the periphery is transformed to lie in the fluctuation range of the magnitude of a small color difference of a contour so as to prevent the contour having a large color difference from being blurred. CCD noise due to color difference is caused by this small color difference and therefore the above two color smoothing steps are very effective processes that can reduce CCD noise due to color difference with no deterioration of the image quality or with making deteriorated image quality non-noticeable.

The image noise reducing process of this embodiment is made so that the block noise reducing step (S21) is first performed, then the mosquito noise reducing step (S22) is subsequently performed, and the CCD noise reducing step (S23) is finally performed. This is because if the mosquito noise reducing step (S22), which is a smoothing process, is performed prior to the block noise reducing step (S21), block noise is entirely smoothened, and it is hard to reduce only block noise in the subsequent block noise reducing step (S21); if the CCD noise reducing step (S23), which is also a smoothing process, is performed prior to the block noise reducing step (S21), block noise is entirely smoothened in the same manner, and it is hard to reduce only block noise in the subsequent block noise reducing step (S21); and if the CCD noise reducing step (S23) is performed prior to the mosquito noise reducing step (S22), mosquito noise is smoothened, and it is hard to reduce only mosquito noise in the subsequent mosquito noise reducing step (S22). Therefore, it is necessary to perform the mosquito noise reducing step (S22) subsequent to the block noise reducing step (S21), and perform the CCD noise reducing step (S23) subsequent to the mosquito noise reducing step (S22).

It is not necessary to limit the present invention to the above embodiment, while various modifications may be made within the scope of the present invention.

For example, in the above embodiment, since the image noise reducing process is performed for image data obtained by decoding JPEG-encoded still images, three image noise reducing steps, namely the block noise reducing step S21, the mosquito noise reducing step S22 and the CCD noise reducing step S23 are performed in this order. However, where an object to be processed is image data that is unlikely to cause block noise and mosquito noise, it is sufficient to perform only the CCD noise reducing step S23. In such a case, the image noise reducing process S2 is made up of the boundary interpolation step S20, the CCD noise reducing step S23 and the boundary block removing step S24.

The color smoothing steps of S41, S42, which are to be performed for the block noise reducing step of S21 in the above embodiment, are effective in smoothing or losing a region of a small color difference, as described above. That is, these steps are also effective for mosquito noise. Accordingly, these color smoothing steps may be made also for the mosquito noise reducing step of S22, while being made along with the color-difference upper-lower-limit table creation step of S40. In either case, by applying the steps of S40-S42 to the color-difference component image data of the image data, image noises in the color-difference component image data are reduced and therefore there is no particular sense in ordering the steps of S40-S42 in the process.

The color smoothing steps of S41, S42, S71 and S72 of the above embodiment employ the one-dimensional filter since it has a large filter size that realizes a shortened process time. However, where it is not necessary to take into account the process time or the filter size, a two-dimensional filter may be employed. It is not necessary to limit a filter used in the block noise reducing steps of S30, S31 to the one-dimensional filter. For example, it is possible to use a two-dimensional filter of 3 by 3 pixels.

In the above embodiment, the block noise reducing steps of S30, S31 employ the weighting filter while the other steps employ the moving average filter. It is not necessary to limit the present invention to this.

In the above embodiment, the image nose reducing process is performed on the computer, while it may be incorporated into a coder, allowing the coder to perform the image noise reducing process in the decoding process (more specifically after an inverse orthogonal transform has been performed).

In the above embodiment, since the RGB conversion is made at the time of decoding a compressed image, the RGB/YCC data conversion (S1) is performed. For a BMP image or the like whose input image contains RGB information, this RGB/YCC data conversion is required. However, for a JPEG image which originally contains YCC information, the RGB/YCC data conversion (S1), and the YCC/RGB data conversion (S3) to be performed therealong are not necessarily required.

This specification is by no means intended to restrict the present invention to the preferred embodiments set forth therein. Various modifications to the method of reducing noise in images, as described herein, may be made by those skilled in the art without departing from the spirit and scope of the present invention as defined in the appended claims.

What is claimed is:

1. A method of reducing image noise which emerges in an image imported from a digital camera equipped with a CCD or other light sensitive device, the method comprising:

applying a first filtering step to luminance component image data of the image with each pixel of said luminance component image data being designated as a target pixel, thereby creating luminance component image data with its entirety smoothened; and applying a second filtering step to color-difference component image data of the image with each pixel of said color-difference component image data being designated as a target pixel, thereby creating color-difference component image data with its entirety smoothened, wherein said method is applied to an image imported from the digital camera whose image data is once encoded on a block-by-block basis and then decoded after imported, said method further comprising:

dividing each of luminance component image data and color-difference component image data of said image data into blocks corresponding to the blocks created in the encoding and decoding of the image data;

applying a third filtering step to the luminance component image data with each of pixels on the boundaries of the blocks being designated as a target pixel, thereby creating a first luminance component image data with the boundaries of the blocks smoothened;

performing a fourth filtering step with each pixel of the first luminance component image data being designated as a target pixel, thereby creating a second luminance component image data with its entirety smoothened;

creating edge image data by subtracting each pixel value of the second luminance component image data from a corresponding pixel value of the first luminance component image data;

creating corrected edge image data with each difference value of the edge image data corrected under given conditions;

creating a third luminance component image data by adding each offset value of the corrected edge image data to its corresponding pixel value of the second luminance component image data;

applying a fifth filtering step to the color-difference component image data with each pixel of the color-difference component image data being designated as a target pixel, thereby creating a first color-difference component image data with its entirety smoothened; and then applying any one of the first and second filtering steps to the third luminance component image data and the first color-difference component image data.

2. The method of reducing image noise according to claim 1, wherein clipped values are used in the third filtering step to have absolute values of the differences in pixel value of each pixel of the filtering range relative to the pixel value of the target pixel kept within a given threshold value.

3. The method of reducing image noise according to claim 1, wherein the corrected edge image data is created by determining a difference from a maximum difference value and a minimum difference value in the edge image data so that where the difference is greater than a threshold value, each difference value of the edge image data is subtracted or added by a given adjusting value so as to have its absolute value decreased to 0 or greater.

4. The method of reducing image noise according to claim 3, wherein each difference value of the edge image data is multiplied by a given adjusting value where said difference is equal to or lower than the threshold value.

5. The method of reducing image noise according to claim 1, wherein any one of the second filtering step and the fifth filtering step is applied to offset data created by creating difference data by calculating the difference between the pixel value of each target pixel and the pixel value of each pixel within a filtering range and clipping the difference data at an upper limit and a lower limit in a given upper-lower-limit table.

6. The method of reducing image noise according to claim 5, wherein the given upper-lower-limit table is created so that for an input value having an absolute value lower than a given threshold value, said input value is designated as an output value, and for an input value having an absolute value equal to or greater than the given threshold value, a threshold value of the same code as that of said input value is designated as an output value.

* * * * *